MAGNETIC COMPUTER

Filed Dec. 24, 1954 2 Sheets-Sheet 1

INVENTOR.
Ernst F. W. Alexanderson
BY
[signature]
ATTORNEY.

MAGNETIC COMPUTER

Filed Dec. 24, 1954 2 Sheets-Sheet 2

INVENTOR.
Ernst F. W. Alexanderson
BY
H. W. Newton
ATTORNEY.

United States Patent Office 2,984,414
Patented May 16, 1961

2,984,414

MAGNETIC COMPUTER

Ernst F. W. Alexanderson, 1132 Adams Road, Schenectady, N.Y.

Filed Dec. 24, 1954, Ser. No. 477,471

19 Claims. (Cl. 235—178)

This invention relates to magnetic amplifier circuits, and more particularly to the use of magnetic amplifiers and saturable reactors for purposes of computation and control.

The value of magnetic amplifiers in systems of computation and control of the nature of additions and subtractions is well established. For such purpose the magnetic amplifier is usually provided with several control windings which can be energized from independent sources of control. A magnetic amplifier of this type is generally self-compensated by rectifier elements and has a magnetic core of such high permeability that the resulting ampere turns needed for control is negligible compared with the ampere turns in the individual control windings. For purposes of computation and control, the magnetic amplifier is therefore usually designed so that the algebraic sum of all the control ampere turns is zero, under reference conditions.

In general it has been found difficult to adapt magnetic amplifiers to computations of the nature of multiplication or division. Accordingly, it is an object of this invention to extend the use of magnetic amplifier circuits to computations of the nature of multiplication or division.

A magnetic amplifier circuit constructed in accordance with the invention includes a pair of individual magnetic amplifiers which are designed and connected in such a manner that the interaction between the amplifiers provides a resultant signal which is representative of the quotient or product of a pair of control signals. The first magnetic amplifier is basically a linear amplifier for transferring a D.C. input voltage into a corresponding A.C. voltage. The second magnetic amplifier which will hereinafter be referred to as a controlled susceptance circuit includes a saturable reactor having a special core construction which is designed to have an alternating current susceptance (inverse of reactance) which is directly proportional to the control current applied to a control winding of that saturable reactor. This may be done by constructing the core of the saturable reactor to have a predetermined saturation curve which is quite different from that of the first magnetic amplifier with which it is associated.

The controlled susceptance circuit is used for multiplication by impressing across its terminals the output voltage of the first magnetic amplifier, this output voltage being representative of one of the signals to be multiplied. The second signal for multiplication is applied to the controlled susceptance circuit to adjust the susceptance to a value which is representative of the second signal. The resultant current flowing in the controlled susceptance circuit is representative of the product of the first and second signals and may be applied to a suitable utilization circuit.

It is, therefore, another object of this invention to provide an improved magnetic computer for computation and control which is provided with a controlled susceptance circuit in which the susceptance is controlled in a manner representative of a control signal applied there.

It is another object of this invention to provide an improved magnetic computer in which first and second electrical signals which are representative of quantities to be combined in operations of multiplication and/or division are applied to a control circuit across which the first of said signals is applied and the susceptance of which is controlled in response to said first signal to be representative thereof.

A still further object of this invention is to provide an improved magnetic amplifier for multiplication and/or division which may be easily constructed at low cost and provides dependable operation over a long operating life.

The novel features which are considered characteristic of this invention are set forth in the appended claims. The invention itself, however, both as to its organization and method of operation, as well as additional objects and advantages thereof, will best be understood from the following description when read in connection with the accompanying drawings in which:

Figure 1*a* is a graph of the saturation characteristic of a saturable reactor for use with the magnetic computer of the invention wherein the ordinate represents magnetic flux of the reactor core and the abscissa represents ampere turns of the control windings;

Figure 1*b* is a diagrammatic view partly broken away, of one type of saturable reactor core configuration for achieving the saturation characteristic shown in Figure 1;

Figure 4:
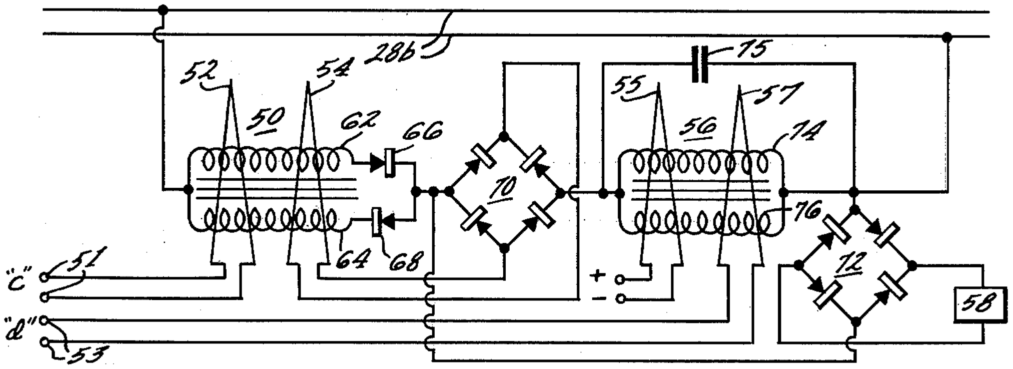
Figure 5:
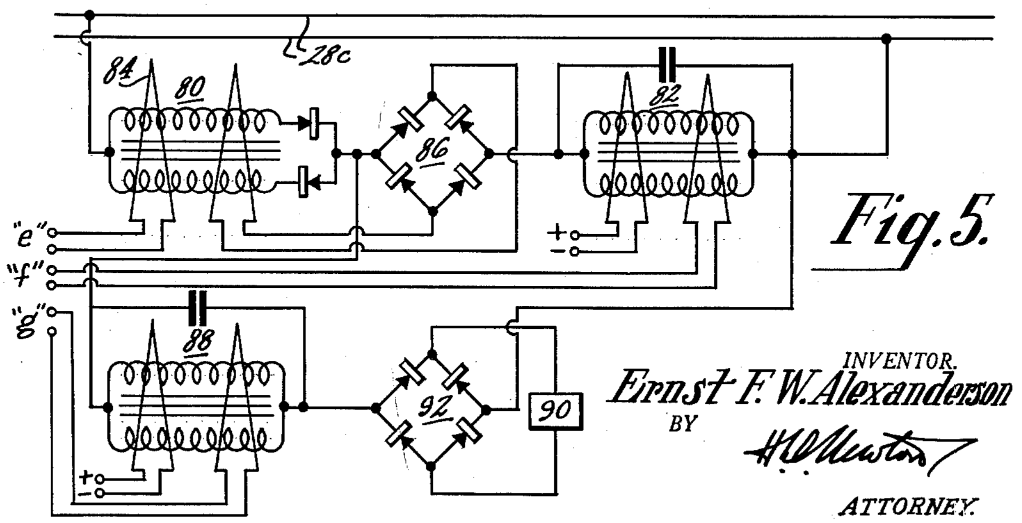

Figure 4 is a schematic circuit diagram of another embodiment of a magnetic amplifier circuit constructed in accordance with the invention for division; and Figure 5 is a schematic circuit diagram of a further embodiment of a magnetic amplifier circuit constructed in accordance with the invention for combined operations of multiplication and division of quantities corresponding to predetermined input signals.

Figure 1A:
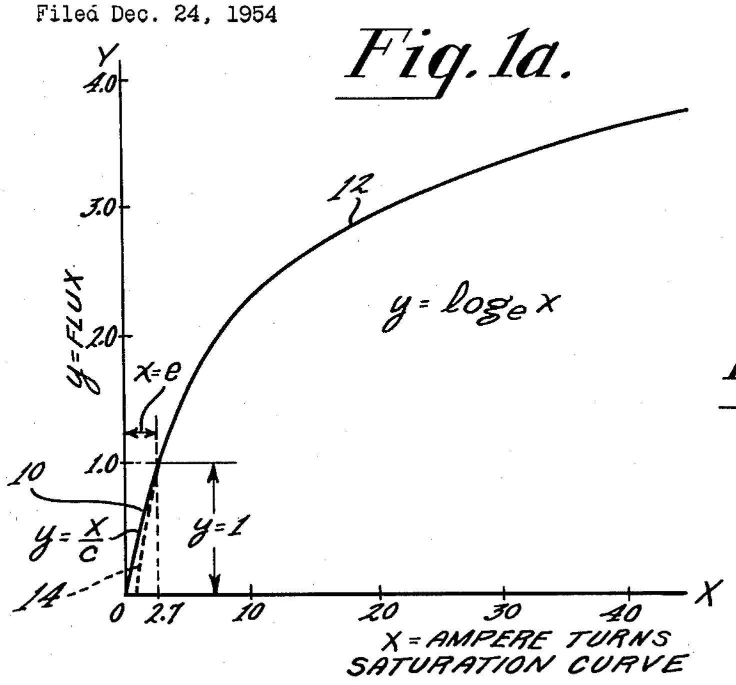
Figure 1B:
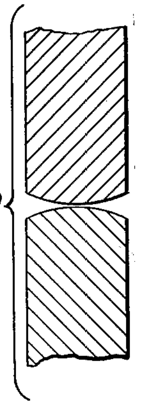

Referring now to the drawing wherein like reference numerals will be used to designate like parts throughout the various figures thereof and referring more particularly to Figure 1*a*, the curve 12 illustrates the saturation characteristic of a saturable reactor which follows the curve of the mathematical formula: $y=\log_e x$. The curve 12 represents the desired saturation characteristic of a saturable reactor for use with the controlled susceptance circuit of the magnetic computer. It is apparent that this saturation curve closely resembles saturation curves which are familiar in electrical machinery such as alternators. It is within the skill of the art to reproduce this saturation curve accurately either by structural design or by choice of magnetic material. Figure 1*b* shows one form of core construction which may be used to achieve this characteristic, wherein the core is provided with an air gap of varying dimension. The core saturates from the center out due to the increasing air gap. By properly shaping the pole faces it is possible to construct a core having a magnetization curve which accurately corresponds to the desired theoretical curve. See, for example, "Ferromagnetism" by Richard M. Bozorth, page 488 and 489; or "Electric Machinery" by A. E. Fitzgerald and C. Kingsley, pages 203 and 204. If desired the core may be provided with teeth on one or both sides of the air gap to further modify the saturation characteristic.

The theoretical curve shown in Figure 1*a* is composed of two parts. The first part 10 is a straight line. The second part 12 represents the equation $y=\log_e x$. The straight line 10 is tangent to the logarithmic curve 12 at a point where the abscissa is the base of the natural logarithm, $e=2.7$. The logarithmic curve is continued as a dotted line 14 until its intersection with the X axis at $x=1$. Only the full drawn part of the logarithmic curve is useful for computation as will hereinafter be described.

Differentiating the equation $y=\log_e x$ we get:

(1) $$dy=\frac{1}{x}dx$$

Interpreted as a saturation curve "$y$" represents flux and "$x$" ampere turns. Therefore, $$\frac{dy}{dx}$$

represents reactance in an alternating current circuit and $$\frac{dx}{dy}$$

represents susceptance. Hence rearranging (1) above, the susceptance:

(2) $$\frac{dx}{dy}=x$$

Figure 2:
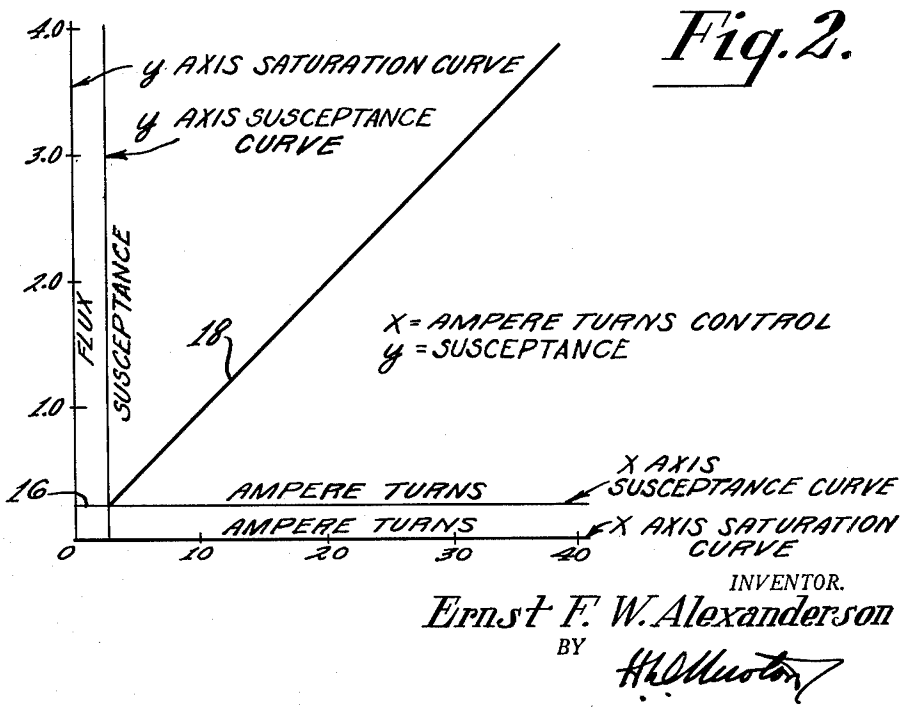
Figure 2 is a graph of the susceptance characteristic of the saturable reactor used with the magnetic computer of the invention wherein susceptance is plotted on the ordinate and ampere turns control is plotted on the abscissa.

Since "$x$" represents ampere turns of the control winding, it can be seen by reference to Figure 2 that the portion of the saturation curve which coincides with the logarithmic curve represents an A.C. susceptance which is proportional to the D.C. ampere turns. This is the result desired. The straight line portion of the saturation curve, however, presents a constant susceptance which is not desired. Means, described below, is provided to eliminate the effect of the straight part of the saturation curve in the control susceptance circuit.

In Figure 2 susceptance is plotted against control ampere turns in the same scale as in Figure 1*a*. The susceptance is plotted on the ordinate and is a constant quantity 16 to a point where "$x$" (control ampere turns) is 2.7 (base of natural logarithm). From then on it is a straight line 18, which, if extended, passes through the origin. The portion of the susceptance characteristic represented by the line 16 is eliminated graphically by adopting a new coordinate system which places the origin at $x=2.7$ and $y=1$ as shown in Figure 2. In a saturable reactor, the physical equivalent of moving the coordinates is to introduce a control winding with a permanent bias corresponding to $x=2.7$ and to shunt the A.C. winding with a capacitor which represents a negative susceptance. The capacitor shunt thus neutralizes the constant reactive susceptance of 2.7. The result in the new coordinates is a composite circuit which has zero susceptance when the control current is zero and a susceptance which increases in linear proportionality with the control current. This is the characteristic desired for the controlled susceptance circuit for use in connection with the magnetic amplifier for multiplication and/or division.

Figure 3:
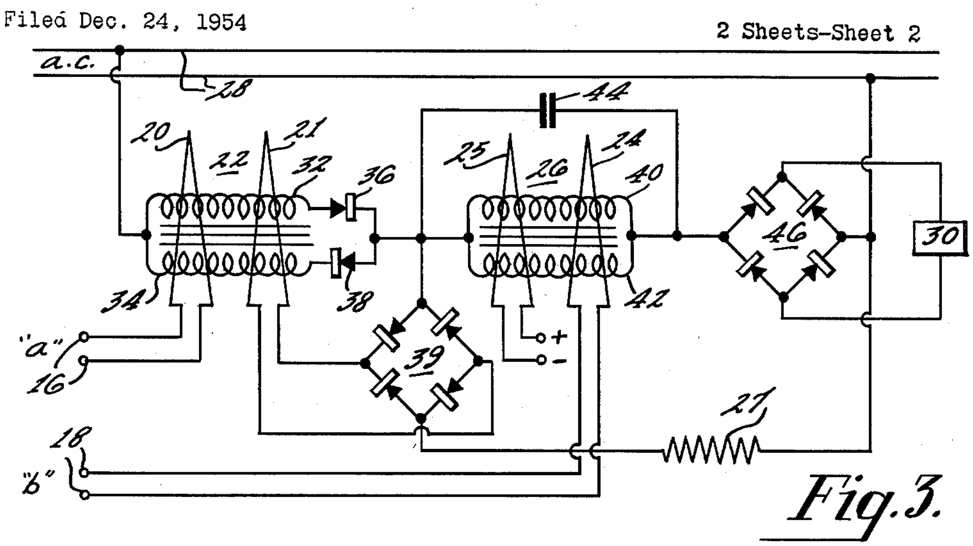
Figure 3 is a schematic circuit diagram of a magnetic amplifier circuit for multiplication constructed in accordance with the invention, which is responsive to predetermined input signals which are representative of the quantities to be multiplied to produce an output signal representative of the product of said quantities.

Referring now to Figure 3 wherein a multiplication circuit is shown, a pair of input signals "$a$" and "$b$" are applied to the signal terminals 16 and 18 respectively. It is the purpose of the multiplication circuit to provide an output signal "$z$" in response to the input signals "$a$" and "$b$" which represent the product of "$a$," "$b$." The input signals, which may also be called control signals, have a voltage or current amplitude corresponding to some predetermined relation to the quantities or functions to be multiplied.

The multiplication circuit essentially comprises the series combination of a magnetic amplifier 22, controlled susceptance circuit 26 and a utilization circuit 30. This series circuit is connected across an alternating current (A.C.) power line 28 which in turn is connected with a suitable power source (not shown). The magnetic amplifier 22 converts the direct current (D.C.) control signal into a corresponding A.C. control signal which is developed across the terminals of the controlled susceptance circuit 26. In effect the controlled susceptance circuit 26 forms the load impedance for the magnetic amplifier 22.

The magnetic amplifier 22 includes a saturable reactor having a pair of load windings 32 and 34, each of which is serially connected with a rectifier 36 and 38, respectively. The rectifiers are so poled that the windings 32 and 34 conduct current only on opposite half cycles of the A.C. power supply voltage. The magnetic amplifier 22 also has a pair of control windings 20 and 21 for controlling the premagnetization of the saturable reactor core. The control winding 20 is connected with the terminals 16 and hence provides saturation of the reactor core in accordance with the amplitude of the input signal "$a$."

In addition to the current path from the magnetic amplifier 22 through the controlled susceptance network 26 and the utilization circuit 30, a shunt path is also provided from the magnetic amplifier 22 through its control winding 21 and a voltage dropping impedance 27. A full wave rectifier network 39 including four rectifiers is so connected between the magnetic amplifier 22 and the resistor 27 that current always flows in the same direction through the control winding 21. The unidirectional current flowing through the winding 21 provides a negative feedback for the magnetic amplifier 22 which serves to regulate the amplifier so that the output voltage developed across the terminals of the controlled susceptance circuit 26 is held proportional to the control signal "$a$." The resistor 27 provides a voltage dropping impedance to control the magnitude of the negative feedback current in the winding 21.

The controlled susceptance circuit 26 includes a saturable reactor having a pair of parallel connected load windings 40 and 42. The saturable reactor is of special construction, to provide a predetermined saturation characteristic of the type previously described in connection with Figures 1 and 2. The saturable reactor also has a pair of control windings 24 and 25 for controlling the level of magnetic saturation of the reactor core. The control winding 24 is connected with the terminals 18 and controls the magnetization and, thus, the susceptance of the controlled susceptance circuit 26 in accordance with the input signals "$b$." The control winding 25 on the other hand is connected with a source of unidirectional current not shown, the magnitude of which is adjusted to provide a predetermined magnetic bias in the core of the saturable reactor. The effect of the control bias winding 25 is the equivalent of moving the ordinate of the graph as is described in connection with Figure 2.

A capacitor 44 is connected across the terminals of the controlled susceptance circuits 26. The capacitor 44 provides a predetermined decrease in the susceptance of the controlled susceptance circuit. The extent of the decrease of susceptance is controlled by the value of the capacitor 44, and is selected to neutralize the constant susceptance of 2.7 as explained in connection with Figure 2. The result in terms of the new coordinates that are established by the bias winding 25 and the capacitor 44 is a composite controlled susceptance circuit 26 which has zero susceptance when the control current is zero and a susceptance which increases in linear proportionality with the control signal applied at the terminals 18. When, by appropriate design, the saturation curve of the controlled susceptance circuit 26 follows the logarithmic curve all the way down to the X axis, the Y axis is, thereby shifted from the logarithmic coordinates to the saturation coordinates so that the permanent magnetic bias is not needed. Capacitor compensation is however still needed. The new origin is at a point which has a value $x=1$ in the logarithm scale. The logarithmic is zero, but the rate of change of the logarithm is 1. This corresponds to a finite value of susceptance which should be neutralized by a shunt capacitor in order to make the susceptance zero when the magnetization is zero.

A rectifier network 46 is connected between the controlled susceptance circuit 26 and the utilization circuit 30. The rectifier network 46 includes four rectifiers, which form a bridge so that current flows in the same direction through the utilization circuit on opposite half cycles of the power source frequency. The utilization circuit 30 comprises a measuring device such as a meter, or, if desired, may be a control circuit which is responsive to the current flowing through the circuit 30.

In the operation of the multiplication circuit, the input signal "*a*" is amplified by the magnetic amplifier 22, and an output alternating current signal corresponding proportionally to the input signal "*a*" is developed across the terminals of the controlled susceptance circuit 26. The input signal "*b*" controls the susceptance of the circuit 26 in linear proportion with the amplitude of the signal "*b*." The total current flowing through the load windings 40 and 42 of the controlled susceptance circuit 26 is a function of the product of the potential across the terminals of the circuit 26 times the susceptance of the circuit. Since the former is proportional to the input signal "*a*," and the latter is proportional to the input signal "*b*," the current in the windings 40 and 42 is proportional to "*a*" times "*b*." The current flowing through the windings 40 and 42 is rectified in the full wave rectifier 46 and passed through the utilization circuit 30, so that the utilization circuit is controlled by a current, the amplitude of which is a function of the product of the input signals "*a*" and "*b*." It is understood that if one of the control signals is an A.C. signal it is possible to dispense with the magnetic amplifier 22, and apply the signal directly across the terminals of the controlled susceptance circuit. However, in most cases it is necessary to provide amplification of the control signal to meet the power requirements of the controlled susceptance circuit.

Reference is now made to Figure 4 which shows a magnetic computer circuit connected for division. That is, to produce an output signal "*y*," which is proportional to the quotient of the pair of input signals one of which, "*c*" corresponds to the dividend, and the other "*d*" corresponds to the divisor. The input signals, as in the circuit for multiplication, may be controlled manually or if desired automatically in response to some measured function to be controlled, and have a voltage amplitude corresponding to a predetermined relation to the quantities or functions to be divided.

Essentially the circuit for division comprises a magnetic amplifier 50 in series with the parallel combination of a controlled susceptance circuit 56 and a utilization circuit 58. This series circuit is connected across the terminals of an alternating current source 28*b*. The magnetic amplifier 50 includes a saturable reactor having a pair of windings 62 and 64, each of which is serially connected with a rectifier 66 and 68, respectively. These rectifiers are so poled that the windings 62 and 64 conduct only on opposite half cycles of A.C. power supply voltage. As in the case of Figure 3, the windings are positioned or wound on the core in such a manner that current flowing through either winding produces a magnetic flux in the reactor core in the same direction. The control windings 52 and 54 control the premagnetization of the reactor core to provide a predetermined output signal corresponding to the control signals applied to the control windings 52 and 54. The control winding 52 is connected to a pair of input terminals 51 to which a first input or control signal "*c*" is applied.

Part of the current flowing through the windings 62 and 64 is directed by way of a full-wave rectifier 70 through the control winding 54 and the controlled susceptance circuit 56. The current in the control winding 54 produces a flux in opposition to the flux produced by the winding 52. In addition to the current path from the magnetic amplifier 50 through the controlled susceptance circuit 56, a shunt current path is also provided from the magnetic amplifier 50 through the utilization circuit 58. A full-wave rectifier network 72 supplies a unidirectional current from the magnetic amplifier 50 to the utilization circuit 58.

The controlled susceptance circuit 56 includes a saturable reactor having a pair of parallel connected load windings 74 and 76. The saturable reactor has a special core construction to provide a linear relationship between the susceptance of the circuit and the control ampere turns, as described above in connection with Figures 1 and 2. The saturable reactor includes a pair of control windings 55 and 57 for controlling the degree of magnetic saturation of the reactor core. As explained hereinabove, the control winding 57 is connected with the input terminals 53 to control the saturation of the reactor core in accordance with the input signal "*d*," and the control winding 55 serves to provide predetermined magnetic bias in the core of the saturable reactor. The magnetic bias has effect corresponding to moving the ordinate of the susceptance curve of the susceptance graph as is shown in Figures 1 and 2. A capacitor 75 is connected across the terminals of the controlled susceptance circuit 56 to provide a negative susceptance for neutralizing the constant susceptance of 2.7 as was also explained in connection with Figure 2. The operation of the circuit for division will now be described.

The equation for division can be written as:

$$\frac{\text{“}c\text{”}}{\text{“}d\text{”}}=\text{“}y\text{”} \qquad (3)$$

This equation can be rewritten as follows:

$$\text{“}c\text{”}-\text{“}dy\text{”}=0 \qquad (4)$$

Thus division is reduced to multiplication and subtraction.

The control signal "*c*" is applied to the magnetic amplifier control winding 52. The output voltage "*y*" of the magnetic amplifier 50 is impressed across the terminals of the controlled susceptance circuit 56. Since the input signal "*d*" is applied to a control winding 57 of the controlled susceptance circuit 56, the current flowing therethrough is proportional to the product of the quotient "*y*" and the input signal "*d*." The current corresponding to this produce is fed to the control winding 54 in opposition to the control signal "*c*" of the magnetic amplifier 50, and the difference is amplified. The result of the process of division is the output voltage "*y*" of the magnetic amplifier, which voltage is preferably rectified for use in other control functions.

The practical application of the system for computation and control here described can be best illustrated by some examples.

One of the difficulties in automatic control of chemical processes is the tendency towards over regulation and hunting. Effective anti-hunting systems have been developed for electromechanical processes. Those anti-hunting means depend upon instantaneous measurement of the process. It is expected that instantaneous interpretation of chemical processes will lead to improvement of automatic operation.

As a practical example it may be assumed that we are dealing with a process of distillation. The input is steam and the output distilled fluid. Means exist for measuring the flow of steam and the flow of distilled fluid. Means also exist for translating these rates of flow into electric currents. The computation which is needed to express the efficiency of the process is to divide the rate of distilled fluid flow by the rate of steam flow. This can be done in accordance with Figure 4 where signal "c" represents distilled fluid flow and signal "d" represents steam flow. The signal "y" represents efficiency and may be used for control of the process.

Reference is now made to Figure 5 which shows a magnetic computor connected for the combined operations of multiplication and division. Three input signals "e," "f" and "g" are provided and the circuit is set up to produce a resultant signal "x" which corresponds to the solution of the equation $$\frac{\text{"}e\text{" "}g\text{"}}{\text{"}f\text{"}}$$

This equation can be written: "eg"−"fx"="0." Thus combined multiplication and division are reduced to multiplication and subtraction.

The combined multiplication and division circuit essentially comprises a magnetic amplifier 80 which is controlled by the signal "e" which is applied to a control winding 84. The output voltage of the magnetic amplifier 80 is impressed upon a control susceptance circuit 82 which in turn is controlled by the input signal "f." The magnetic amplifier and controlled susceptance circuit 82 are connected in series across an alternating current power line 28c. The resultant current through the series combination is rectified in the rectifier network 86 and applied as negative feedback to the magnetic amplifier 80. As described above in connection with Figure 4, the output voltage of the magnetic amplifier 80 is proportional to the signal "e" divided by the signal "f."

This same A.C. output voltage is impressed on another controlled susceptance circuit 88, which, in turn, is controlled by the input signal "g." Thus the current "x" flowing through the susceptance circuit 88 represents the product of A.C. output voltage from the magnetic amplifier 80 and the controlled susceptance circuit 82

$$\frac{\text{"}e\text{"}}{\text{"}f\text{"}}$$

and the control signal "g." The current "x," which is representative of the solution of the equation is rectified by a full-wave rectifier 92 and applied to the utilization circuit 90.

An application which requires a combination of multiplication and division may be described as follows:

A ship is driven by a diesel engine. Measurement of the torsional deflection of the shaft delivers a first signal. A second signal represents the rate of fuel flow to the engine. A third signal measures engine speed. It is desired to have a continuous and instantaneous measure of the efficiency of the engine which may be used to control its operation. The computation consists in multiplying the first signal by the third and dividing by the second.

It can be seen that in accordance with the present invention, an improved magnetic amplifier and saturable reactor circuit for purposes of computations and control in the nature of multiplication and/or division has been provided, which may be easily constructed at low cost, and which provides dependable operation over a long operating life.

What is claimed is:

1. A magnetic computer comprising, in combination: first and second means for receiving first and second signals, respectively, representative of quantities to be combined in a predetermined mathematical relationship; a magnetic amplifier; means connecting said first means with said magnetic amplifier to apply the first control signal thereto; a controlled susceptance circuit including a saturable reactor having a core with pole pieces formed to provide a saturation characteristic which has a relatively large logarithmic portion and a relatively small non-logarithmic portion; means connecting said second means with said controlled susceptance circuit for controlling the susceptance thereof; an output circuit for said magnetic amplifier including said controlled susceptance circuit; and a utilization circuit responsive to current flow through said controlled susceptance circuit.

2. A magnetic computer as defined in claim 1, including a capacitor connected in parallel with said controlled susceptance circuit for neutralizing the fixed susceptance of said susceptance circuit corresponding to said non-logarithmic portion.

3. A magnetic computer as defined in claim 1 including means providing a fixed magnetic bias for said core whereby said controlled susceptance circuit operates on said logarithmic portion of said characteristic.

4. In a magnetic computer, a controlled susceptance circuit having a saturable reactor including a load winding and a pair of control windings on a saturable magnetic core, said core having pole pieces formed to provide a saturation characteristic which, as a function of the current through said control windings, has a logarithmic portion and a non-logarithmic portion, means for applying control signals to one of said control windings, means including the other one of said control windings for providing a magnetic bias for said core whereby said core operates on the logarithmic portion of said saturation characteristic, and capacitance means connected across the terminals of said controlled susceptance circuit for neutralizing the susceptance of said load winding due to said bias.

5. A magnetic computer for combining first and second input signals which are representative of quantities to be combined mathematically comprising, in combination: a magnetic amplifier; means for applying said first input signals to said magnetic amplifier; a controlled susceptance circuit including a saturable reactor having a core with pole pieces formed to provide a saturation characteristic which has a relatively large logarithmic portion and a relatively small non-logarithmic portion; means for applying said second signals to said controlled susceptance circuit for controlling the susceptance of said susceptance circuit in linear proportionality to said second input signals; means providing an energizing potential circuit; means connecting said magnetic amplifier and said susceptance circuit in series with said energizing potential circuit; and utilization means connected with said controlled susceptance circuit.

6. A magnetic computer as defined in claim 5, wherein said utilization means is connected in series with said magnetic amplifier, said control susceptance circuit and said energizing potential circuit.

7. A magnetic computer for combining first and second input signals which are representative of quantities to be combined in a predetermined mathematical relationship comprising, in combination, a magnetic amplifier, means for applying said first input signal to said magnetic amplifier, a controlled susceptance circuit including a saturable reactor having a load winding and a pair of control windings on a saturable magnetic core, said core having pole pieces formed to provide a saturation characteristic which, as a function of the current through said control windings, has a first non-logarithmic portion and a second, logarithmic portion, means for applying said second input signal to one of said control windings, means including the second of said control windings for providing a magnetic bias for said reactor core whereby said core operates on the logarithmic portion of said saturation characteristic, a capacitor connected across the terminals of said controlled susceptance circuit for neutralizing the fixed susceptance produced by said magnetic bias, an output circuit for said magnetic amplifier including said controlled susceptance circuit, and utilization circuit means connected with said controlled susceptance circuit.

8. In a magnetic computer system for multiplying quantities represented by a pair of electrical control signals, the combination comprising: a magnetic amplifier having a control winding, a controlled susceptance circuit including a saturable reactor having a core with pole pieces formed to provide a saturation characteristic which has a first, non-logarithmic portion and a second, logarithmic portion, a control winding for said saturable reactor, means for applying one of said pair of control signals to said control winding of the magnetic amplifier, an output circuit for said magnetic amplifier for developing an output voltage proportional to said one signal, means for impressing said output voltage across the terminals of said controlled susceptance circuit, means for applying the other of said pair of signals to the control winding of said saturable reactor for controlling the susceptance of said susceptance circuit in linear proportionality with said other signal, and a utilization circuit responsive to current flowing through the controlled susceptance circuit and connected in series with said saturable reactor.

9. A magnetic computer as claimed in claim 8, including means providing a fixed magnetic bias for said core whereby said controlled susceptance circuit operates on said logarithmic portion of said characteristic.

10. A magnetic computer as defined in claim 8, wherein said magnetic amplifier has a second control winding, and including: means for rectifying the output voltage of said magnetic amplifier, and means for applying the rectified voltage to said second control winding.

11. A magnetic computer as claimed in claim 10, including a capacitor connected across the terminals of said controlled susceptance circuit for neutralizing the fixed susceptance of said reactor when the current in said control winding of said reactor is zero.

12. A magnetic computer system for multiplying quantities represented by a pair of electrical control signals comprising, in combination: a magnetic amplifier having a control winding; a controlled susceptance circuit including a saturable reactor having a core with pole pieces formed to provide a saturation characteristic which has a logarithmic portion; a control winding for said saturable reactor; means for applying one of said pair of control signals to said control winding of said magnetic amplifier; means connecting said magnetic amplifier and said controlled susceptance circuit in series for developing across the terminals of said controlled susceptance circuit a voltage proportional to said one of said control signals; means for applying the other of said pair of control signals to said control winding of said saturable reactor for controlling the susceptance of said susceptance circuit in linear proportionality with said other of said control signals; and a utilization circuit connected in series with said saturable reactor and responsive to current flowing through said controlled susceptance circuit.

13. A magnetic computer for dividing a first signal by a second signal, which signals are representative of the quantities to be divided, comprising in combination, a magnetic amplifier having a pair of control windings, a controlled susceptance circuit including a saturable reactor having a core with pole pieces formed to provide a saturation characteristic having a logarithmic portion, a control winding for said saturable reactor, means for applying said first signal to one of the control windings of said magnetic amplifier, an output circuit for said magnetic amplifier, means for impressing the output voltage of said magnetic amplifier on said controlled susceptance circuit, means for applying said second signal to the control winding of said saturable reactor, means for rectifying the current flowing through the controlled susceptance circuit and applying the rectified current to the other of said control windings of said magnetic amplifier in opposition to the control effect produced by said first signal, and a utilization circuit connected in parallel with said controlled susceptance circuit.

14. A magnetic computer as claimed in claim 13, wherein said pole pieces are formed to provide a saturation characteristic which has a logarithmic portion and a non-logarithmic portion, and means providing a fixed magnetic bias for said core whereby said controlled susceptance circuit operates on said logarithmic portion of said characteristic.

15. A magnetic computer as claimed in claim 13, including a capacitor connected across the terminals of said controlled susceptance circuit for neutralizing the fixed susceptance of said reactor when the current through the reactor control winding is zero.

16. A magnetic computer for dividing a first signal by a second signal, which signals are representative of quantities to be divided, comprising in combination, a magnetic amplifier having a pair of control windings, a controlled susceptance circuit including a saturable reactor having a core with pole pieces formed to provide a saturation characteristic having a logarithmic portion, a control winding for said saturable reactor, means for applying said first signal to one of said control windings of said magnetic amplifier, means connecting said magnetic amplifier in series with said controlled susceptance circuit for developing an output voltage across the terminals of said controlled susceptance circuit, means for applying said second signal to the control winding of said saturable reactor, means for rectifying the current flowing through the controlled susceptance circuit and applying the rectified current to the other of said control windings of said magnetic amplifier in opposition to the control effect produced by said first signal, and means connecting a utilization circuit in series with said magnetic amplifier.

17. A system of combined multiplication and division comprising: three signal input circuits, a magnetic amplifier, two controlled susceptance circuits each having a saturable reactor with a core having pole pieces formed to provide a saturation characteristic having a logarithmic portion, alternating current power supply means for said system, means connecting a first of said signal input circuits with said magnetic amplifier for controlling the current flowing therethrough, means connecting said power supply means and said magnetic amplifier in series with a first of said controlled susceptance circuits, means connecting a second of said signal input circuits with said first controlled susceptance circuit for controlling the susceptance of said circuit in accordance with the magnitude of control signals applied to said second signal input circuit, means for rectifying the current flowing through said first controlled susceptance circuit, further means for controlling the conductivity of said magnetic amplifier in opposition to the control by signals applied to said first signal input circuit and in accordance with the current produced by said rectifying means, means connecting the second of said controlled susceptance circuits in parallel with said first controlled susceptance circuit, means connecting a third of said signal input circuits with said second controlled susceptance circuit for controlling the susceptance of said circuit in accordance with the magnitude of signal applied to said third signal input circuit, and utilization circuit means connected in series with said second controlled susceptance circuit.

18. A magnetic computer for multiplying quantities represented by two electrical control signals, said computer comprising a controlled susceptance circuit, said susceptance circuit including a saturable reactor circuit having a magnetic core and a control winding linked to said core, said core including pole pieces formed to produce in said susceptance circuit a susceptance proportional to the current in said control winding, means for applying one of said control signals to said control winding, means for applying an energizing potential to said susceptance circuit including means for controlling said energizing potential in accordance with the other of said control signals, and output means connected to receive the current in said susceptance circuit.

19. A magnetic computer as recited in claim 18 wherein said controlling means includes a magnetic amplifier.

References Cited in the file of this patent

UNITED STATES PATENTS

| | | |
|---|---|---|
| 2,574,438 | Rossi et al. | Nov. 6, 1951 |
| 2,587,193 | Miller | Feb. 26, 1952 |

OTHER REFERENCES

"Magnetic Amplifiers of the Balance Detector Type" (Geyger), AIEE Miscellaneous paper 50–93. December 1949.

Waveforms, Chance et al., Radiation Laboratory Series, vol. 19, McGraw-Hill Book Co., New York, 1949, pp. 669–670 relied on.

"On Mechanics of Magnetic Amplifier Operation" (Ramey), AIEE Technical Paper 51–2.17, May 1951, 179–171 (MA).

"The Single-Core Magnetic Amplifier as a Computer Element," Ramey, Naval Research Laboratory Report 4030, August 1952.

"Magnetic Amplifier Circuits and Applications," (Ramey), Electrical Engineering, vol. 72, No. 9, September 1953, pp. 791–795.